United States Patent
Beach

(10) Patent No.: US 7,355,608 B1
(45) Date of Patent: Apr. 8, 2008

(54) METHOD FOR PRIORITY TRANSMISSION AND DISPLAY OF KEY AREAS OF IMAGE DATA

(75) Inventor: Mark J. Beach, Elba, MN (US)

(73) Assignee: International Business Machines Corporation, Armonk, NY (US)

( * ) Notice: Subject to any disclaimer, the term of this patent is extended or adjusted under 35 U.S.C. 154(b) by 844 days.

(21) Appl. No.: 09/181,402

(22) Filed: Oct. 28, 1998

(51) Int. Cl.
*G06F 11/00* (2006.01)
*G09G 5/00* (2006.01)

(52) U.S. Cl. ...................... 345/629; 345/619
(58) Field of Classification Search ............... 345/433, 345/435, 335, 331, 357, 356, 637, 619, 629, 345/2.1, 2.2, 2.3; 709/240
See application file for complete search history.

(56) References Cited

U.S. PATENT DOCUMENTS

| | | | | |
|---|---|---|---|---|
| 4,924,414 A | * | 5/1990 | Ueda | 364/522 |
| 4,951,231 A | * | 8/1990 | Dickinson et al. | 364/521 |
| 5,280,568 A | * | 1/1994 | Obata | 395/121 |
| 5,426,513 A | * | 6/1995 | Scorse et al. | 358/433 |
| 5,477,445 A | * | 12/1995 | Weber | 700/83 |
| 5,481,312 A | * | 1/1996 | Cash et al. | 348/466 |
| 5,574,476 A | * | 11/1996 | Inoue et al. | 345/100 |
| 5,778,372 A | * | 7/1998 | Cordell et al. | 707/100 |
| 5,784,610 A | * | 7/1998 | Copeland, III et al. | 395/615 |
| 5,826,031 A | * | 10/1998 | Nielsen | 395/200.63 |
| 5,880,728 A | * | 3/1999 | Yamaashi et al. | 345/343 |
| 5,880,740 A | * | 3/1999 | Halliday et al. | 345/435 |
| 5,949,431 A | * | 9/1999 | Matsumura et al. | 345/435 |
| 6,023,722 A | * | 2/2000 | Colyer | 709/201 |
| 6,112,234 A | * | 8/2000 | Leiper | 709/219 |

OTHER PUBLICATIONS

Microsoft Press, "Microsoft FrontPage 97 Step by Step", 1997, pp. 207-212.*

* cited by examiner

*Primary Examiner*—Jeffery A Brier
(74) *Attorney, Agent, or Firm*—Schmeiser, Olsen & Watts

(57) ABSTRACT

A method and an apparatus for selecting, prioritizing, saving, and receiving image data are disclosed. Portions of an image can be selected and the selected portions assigned priorities using preferred embodiments of the present invention. The prioritized image portions can then be saved in a prioritized graphics file. The image can be saved in any graphics file format. When a user accesses the prioritized graphics file, the highest priority portions of the image will be sent to and received by the user first. These highest priority portions will then be displayed to the user. Lower priority portions will subsequently be sent and received until the entire image is displayed to the user. This allows the areas of higher priority to be seen by the user before the user sees areas of lower priority.

4 Claims, 6 Drawing Sheets

METHOD FOR PRIORITY TRANSMISSION AND DISPLAY OF KEY AREAS OF IMAGE DATA

BACKGROUND OF THE INVENTION

1. Field of the Invention

This invention relates generally to computer graphics. More specifically, this invention relates to sending and receiving computer graphics.

2. Background Art

The development of the EDVAC computer system of 1948 is often cited as the beginning of the computer era. Since that time, computer systems have evolved into extremely sophisticated devices, and computer systems may be found in many different settings. Computer systems typically include operating system software that controls the basic function of the computer, and one or more software applications that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the software applications designed for high performance computer systems have become extremely powerful.

Other changes in technology have also profoundly affected how we use computers. For example, the widespread proliferation of computers prompted the development of computer networks that allow computers to communicate with each other. With the introduction of the personal computer (PC), computing became accessible to large numbers of people. Networks for personal computers were developed to allow individual users to communicate with each other. In this manner, a large number of people within a company could communicate with other computer users in a convenient and efficient manner.

One significant computer network that has recently become very popular is the internet. The internet grew out of the modern proliferation of computers and networks, and has evolved into a sophisticated worldwide network of computer systems linked together by web pages that collectively make up the "World-Wide Web", or WWW. A user at an individual PC (i.e., workstation) that wishes to access the WWW typically does so using a software application known as a web browser. A web browser makes a connection via the WWW to other computers known as web servers, and receives information from a web server that is displayed on the user's workstation. Information displayed for the user is typically organized into pages that are constructed using a specialized language called Hypertext Markup Language (HTML). The user can navigate to any page by inputting the address or Uniform Resource Locator (URL) into the web browser. URLs are simply formatted text strings which identify the location of a WWW resource.

The explosion of the internet and of networks in general has brought internet technology to even very small companies. Many companies today have "intranets" that act like the internet. Computer users in these companies can view pages, get data, and navigate around the intranet just as if the intranet was actually the internet. Some companies allow both intranet and internet access by employees, which makes the intranet almost "transparent" to the general user. He or she may have no idea that there are two separate networks. Intranets and the internet are important to many companies because employees can transfer files, communicate with other employees, apply for new positions, and even hold meetings over these networks.

As these networks have grown and increased in popularity, the types of data sent over the networks have changed dramatically. Originally, simple text (alphabetic letters) documents were the only data sent; now, transmission of graphics (e.g., pictures, photographs, diagrams), sound, and video are commonplace. These types of files tend to be very large. Because of this, people using the network may have to wait quite a long time before the various graphics that are on an intranet or internet page actually get rendered on the user's screen. This is particularly true if the server sending the information is slow or the connection to the network is slow. Even fast servers and fast connections will periodically slow to a crawl if large graphics files are being transferred.

From the user's perspective, this wait for graphics to load is at best annoying and at worst maddening. The user generally wants to get his or her information and go somewhere else. Advertisers also find this delay annoying because the consumer—the computer user who is looking at a page containing the advertisement—will generally not wait for the advertisement to completely load before going to a new page or scrolling down the current page such that the advertisement cannot be seen. Text generally loads first on most systems because it can be transferred so quickly. Thus, the consumer can get his or her information and go somewhere else well before the graphical advertisement is displayed.

As the number of network users continue to increase and the use of graphics rapidly expands, it will become increasingly important for graphics to load faster. This would allow the user or consumer to not waste time waiting for graphics to load, and it allows advertisers to ensure that their advertisement is actually being viewed by consumers. Without improvements in the way graphics load, users and consumers will be constantly perturbed by slow loading graphics.

SUMMARY OF THE INVENTION

An apparatus and method for prioritizing the transmission and display of key areas of image data is disclosed. Using a preferred embodiment, a person who wants certain parts of an image to be sent before other parts of the image would select these more important areas and assign priorities to the selected parts of the image. In addition, a default priority could be assigned to areas of the image not selected or not assigned a priority. The image is then saved in a file format such that the highest priority images are placed towards the beginning of the file.

When the image is sent to a user, the prioritized image will be sent in terms of this priority. The highest priority portions will be sent first and the lowest priority portions will be sent last. The user will, then, normally receive the highest priority portions first. Thus, the highest priority portions will be displayed and viewed first by the user.

The foregoing and other features and advantages of the present invention will be apparent from the following more particular description of the preferred embodiment of the invention, as illustrated in the accompanying drawings.

BRIEF DESCRIPTION OF DRAWINGS

The preferred exemplary embodiments of the present invention will hereinafter be described in conjunction with the appended drawings, where like designations denote like elements, and.

BEST MODE FOR CARRYING OUT INVENTION

1. Overview

Figure 1:
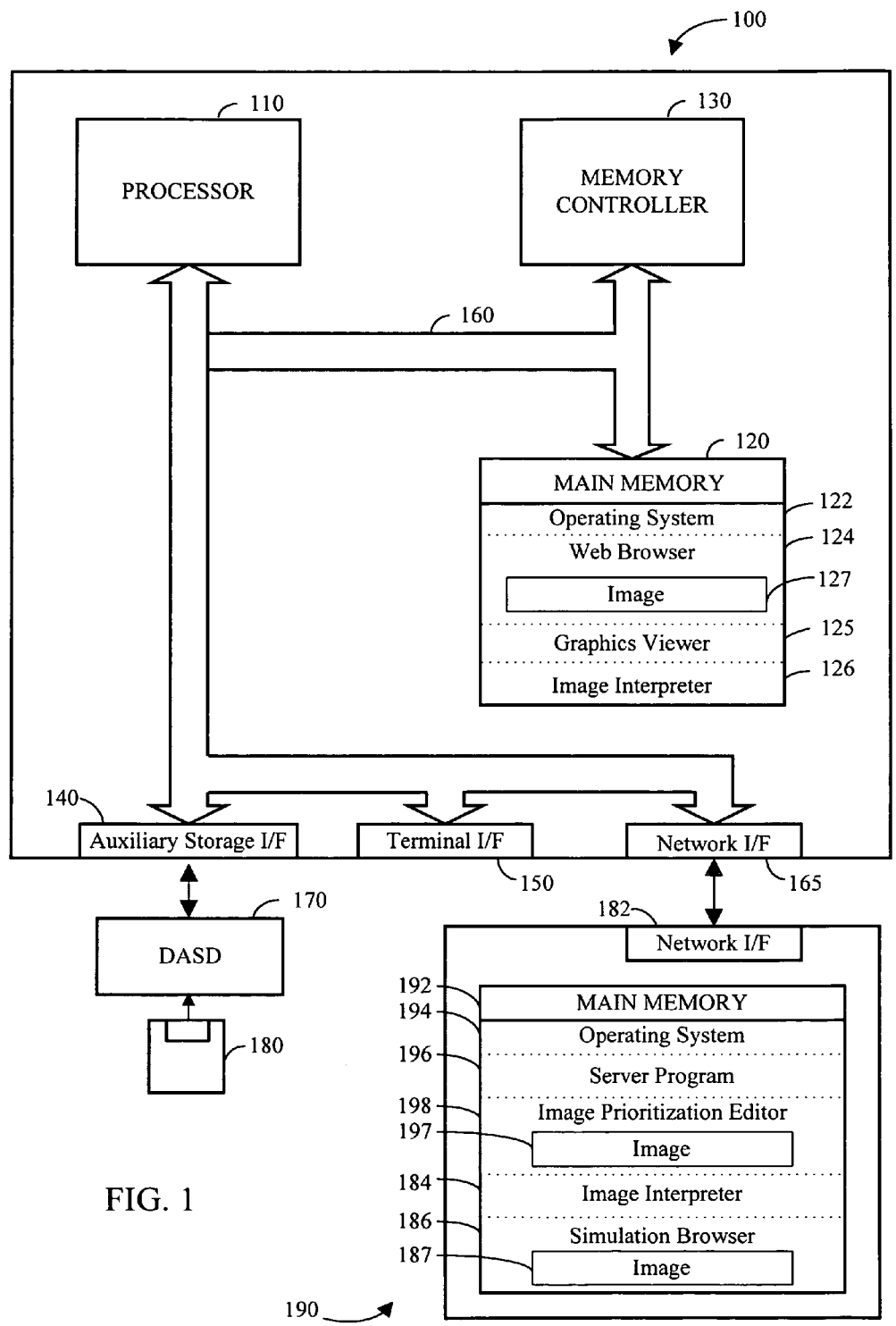
FIG. 1 is a block diagram of a receiving computer system interoperating with a transmitting computer system in accordance with a preferred embodiment of the present invention.

The method and apparatus of the present invention have particular applicability to graphics file formats, many of which use data compression. For those individuals who are not familiar with these concepts, a brief overview of relevant graphics file formats and data compression concepts is presented here.

Compression

Compression can be used to reduce the size of computer files containing a large number of ones and zeros because series of ones and zeros tend to repeat. In addition, some of the information represented by the ones and zeros can have minor discrepancies (slight changes in the series of ones and zeros) without adversely affecting the information. Compression is least useful when there are few, if any, repeating patterns of ones and zeros, and when the slightest error in the information cannot be tolerated. For instance, a bank's customer and checking account database will likely not tolerate errors and will generally not have too many repeating series of numbers or letters.

Compression is particularly useful for graphics and image files, however, because these files are generally very large and much of the information in the files is redundant. Graphics files get so large because each file is made up of "pixels," the smallest individual representation of an image, and each pixel can need a lot of data to adequately describe it. For instance, if a black and white picture is digitally stored with 256 shades of grey, each pixel will then be eight bits (each bit being a one or zero). Each eight bits will indicate which shade of grey, of the 256 shades of grey, each pixel represents. Storing images in color generally adds many more bits per pixel because each color (red, green, and blue) will be represented by a number of bits.

Many of these pixels are redundant. For example, if a picture of the sky is being stored as a file, there will be large regions of the sky that will be blue (the sky) or white (the clouds). Instead of storing each pixel, it is possible to compress the image by storing a starting pixel and then only those pixels that change color. For instance, if the pixel in the upper left-hand corner of the image is blue, 100 pixels to the right of this starting pixel are also blue, and 100 pixels to the right of the last blue pixel are white, only some of this information need be stored. The starting pixel's digital color and location followed by the number 101 and the white pixel's digital color followed by the number 100 is all that is needed to store this segment of the file. This is in contrast to storing all 201 pixels and each pixel's color. In this way, the entire image can be stored in the file, but the amount of information used to store the picture will be substantially less than the normal, non-compressed image's file.

Data compression can be split into two large classes, lossless and lossy. Lossless compression means that the picture, and each digital number that represents a particular color for each pixel, will be compressed and decompressed such that the original and decompressed images will be the same. A picture that has been compressed and decompressed using lossless compression will be mathematically and pictorially equivalent to the original picture. Compression and decompression of an image by using lossy compression methods, on the other hand, will result in a picture in which some information has changed. The compressed and decompressed image will not be the mathematical and pictorial equivalent of the original picture. However, many times this difference between the original and the uncompressed image is not noticeable to the human eye. The human eye tends to blur pixels together, such that an error in one pixel may not even be visible. In addition, the human brain tends to insert the correct information into an image even when an error is found. Because of these anomalies, an image that has errors, even significant errors, will tend to be correctly reconstructed in a viewer's mind.

One of the simplest lossless compression schemes is Run Length Encoding (RLE). RLE is effective when there are series of ones and zeros that tend to repeat. RLE basically comprises counting the number of ones or zeros and then putting this number and the datum being stored into the file. For instance, if there are one hundred ones, then RLE would store "100 ones" instead of storing all one hundred ones.

A more advanced lossless encoding scheme is called Huffman encoding. In Huffman encoding, the specific data element in an image or file that repeats the most is represented by the smallest number of bits. The second most common data element is represented by a slightly larger number of bits, and so on until the least common data element is represented by a long string of bits. For instance, in the English language, the letter "e" is the most common letter in text, while the letter "z" is the least common letter in text. As an example, in the previous sentence there are 21 e's and only one z. Huffman encoding would assign a single bit (a one or zero) to the letter e and a long string of ones and zeros to the letter z. But because the letter z is hardly ever used and the letter e is frequently used, a digital, compressed representation of text should be much smaller than a digital, uncompressed representation of the same text.

For images, a function known as the Discrete Cosine Transform (DCT) can be applied to a two-dimensional block of data to achieve significant compression. The DCT will generally be lossy because the numbers calculated using the DCT will usually be truncated. The DCT basically analyzes a two-dimensional block of image data and results in one average (called the DC level) and several coefficients for each block. The average is the average of the input two-dimensional block of data and the coefficients are magnitudes of the frequency content at specific frequencies from zero. An easier way to think about the DCT is that the DC level gives the average color in the block and the frequency coefficients represent differences between other colors in the block and the DC level. If there are no differences between the average color and the rest of the pixels in the block (for instance, if the block is a portion of blue sky), then the frequency components will all be zero. In general, with small block sizes the frequency components will tend to be zero or close to zero in many images because the color deviation in these small blocks is not that great. The inverse DCT, then, takes the information from the DCT and uses it to recreate the image.

Finally, another compression method used mainly for images is the Lempel-Ziv-Welch (LZW) compression scheme. This method is similar to RLE in that it uses repeated strings to compress a file. Basically, this method initially places phrases (also called character strings), which are snippets of an image, into a compressed file. Any subsequent, equivalent phrase is not put into the compressed file; instead, the location (called a code) of the same, previous phrase is placed into the file. For instance, if the partial sentence "The men and the women" is compressed by using the LZW algorithm, the first "the" will be placed into the compressed file and the second "the" will not. In place of the second "the" will be a pointer that points to the first "the." Thus, there are generally bits added to the data that indicate whether the data is real data (as in "the") or pointers to real data.

Implementations of the LZW algorithm generally put the phrases into a code table. As the file is being compressed, the table is built as the phrases are constructed. For instance, in the phrase used above the first entry in the table would be "The", the second entry in the table would be "men", the third entry in the table would be "and", and the fourth entry in the table would be "women." Similarly, the decoder would build the same table as the file is being received.

Graphics File Formats

There are many graphics file formats. The simplest file formats generally contain information about the size of the picture in pixels (e.g., 640 pixels by 480 pixels) and then contain each pixel's digital information. Images will usually be in black and white, grey-scale, or color. Thus, information about the type of file (color, black and white) will also be contained in the graphics file. If the image is color, the color is sometimes stored as a series of "planes," each plane containing one or more colors (red, green, or blue) or brightness information. This somewhat simplistic method of storing images goes by the general name of "bitmap," because there is usually a "mapping" of pixels from the image to the file. Because pixels can be represented by bits, these files developed the bitmap nomenclature. Each pixel has an equivalent bit pattern in the bitmap file, and all of the pixels of the image are generally stored in order from some starting point to some ending point. The term bitmap has become somewhat of a misnomer over the years since the first bitmap files were generated because compression schemes have been added that destroy the one-to-one mapping between pixels and files.

More complex file formats tend to allow compression schemes and other, more complex mapping schemes. One such file format of interest for images is Graphics Interchange Format (GIF). GIF allows interlacing, which is a process whereby graphics files are divided into groups of lines and each group is loaded on the user's computer in order. This has the effect of allowing the user to see some of the information in the graphics file while other parts of the file is loading. To the user, this appears as a fuzzy, nondescript image that slowly develops into one clear image. In GIF, one formatting method for interlaced files is to divide the image into four groups, each group containing many lines: Group One has every eighth row, starting with row zero; Group Two has: every eighth row, starting with row four; Group Three has every fourth row, starting with row two; and Group Four has every second row, starting with row one. The user will see the zero row followed by every eighth row, the fourth row followed by rows 12, 20, 28, etc. In this manner, GIF allows some information to be seen while the user waits for other information from the image to reach his computer.

The GIF format can use LZW compression. There are a variety of methods to implement LZW compression in GIF, including allowing the code table to increase automatically. Thus, as an image is received, the code table is allowed to grow with the increase in received image size.

Another more complex and also very important file format for graphics is the Joint Photographic Experts Group (JPEG) format. This format works on a two-dimensional block basis and combines the DCT, Huffman encoding, and RLE to allow excellent compression. JPEG generally starts at one block (usually the upper left corner) of the file and compresses the file in blocks from the left-most block to the right-most block for each section of graphics file. From the user's perspective, entire sections of the file seem to appear at once, starting with the topmost section and ending with the bottom most section. JPEG can be made to be lossless, but the best compression occurs with lossy compression.

2. Detailed Description

The current invention allows certain parts of an image to be sent before other parts of the image. An image designer (the person deciding which parts of the image are more important) can select these more important areas, then assign priorities to these selected areas. In addition, a default priority may be assigned to the areas of the image that are not assigned priorities. The image is saved in a file such that the highest priority portions will be transmitted before the lower priority portions. Generally, the highest priority portions will be placed towards the beginning of the files and the lower priority portions towards the end of the file.

When the image is sent to a user, the prioritized image will be sent in terms of this priority. The highest priority portions will be sent first and the lowest priority portions will be sent last. The user will, then, normally receive the highest priority portions first. Thus, the highest priority portions will be displayed and viewed first by the user.

Referring now to FIG. 1, a computer system 100 in accordance with a preferred embodiment of the present invention includes the following: a processor 110; a terminal interface 150; a network interface 165; an auxiliary storage interface 140; a Direct Access Storage Device (DASD) 170; a floppy disk 180; a bus 160; and a main memory 120. In this example, main memory 120 includes an operating system 122, a web browser 124 containing an image 127, a graphics viewer 125, and an image interpreter 126. It should be understood that bus 160 is used to load these items into main memory 120 for execution. Computer system 100 in this example represents a computer that is capable of receiving a prioritized image and displaying the prioritized image in its prioritized order.

Also shown in FIG. 1 is server 190, which is connected to system 100 through network interfaces 182 and 165. Only the most salient parts of server 190 have been shown in FIG. 1. These parts are main memory 192, operating system 194, server program 196, image prioritization editor 198 containing an image 197, image interpreter 184, and simulation browser 186 containing another image 187. Server 190 in this example contains both server capability, for sending files, and prioritization editing capability, for allowing someone to select portions of an image file, assign priorities to these portions, and save the file in an image format that supports prioritized images.

Processor 110 performs computation and control functions of system 100. The Processor 110 associated with system 100 may comprise a single integrated circuit, such as a microprocessor, or may comprise any suitable number of integrated circuit devices and/or circuit boards working in cooperation to accomplish the functions of a central processing unit. Processor 110 is capable of suitably executing the programs contained within main memory 120 and acting in response to those programs or other activities that may occur in system 100.

Main memory 120 is any type of memory known to those skilled in the art. This would include Dynamic Random Access Memory (DRAM), Static RAM (SRAM), flash memory, cache memory, etc. While not explicitly shown in FIG. 1, main memory 120 may be a single type of memory component or may be composed of many different types of memory components. In addition, main memory 120 and processor 110 may be distributed across several different computers that collectively comprise system 100. Computer system 100 of FIG. 1 simply illustrates many of the salient features of the invention, without limitation regarding the physical location of Processor 110 or memory locations within main memory 120.

Bus 160 serves to transmit programs, data, status and other forms of information or signals between the various components of system 100. The preferred embodiment for bus 160 is any suitable physical or logical means of connecting computer systems and components known to those skilled in the art. This includes, but is not limited to, direct hard-wired connections, internet connections, intranet connections, fiber optics, infrared (IR) and other forms of wireless connections. It is anticipated that many alternative methods and material for connecting computer systems and components will be readily adapted for use with the present invention. This would include those methods and materials not presently known but developed in the future.

Terminal interface 150 allows human users to communicate with system 100. Auxiliary storage interface 140 represents any method of interfacing a storage apparatus to a computer system known to those skilled in the art. Auxiliary storage interface 160 allows auxiliary storage devices such as DASD 170 to be attached to and communicate with the other components of system 100. While only one auxiliary storage interface 160 is shown, the present invention anticipates multiple interfaces and multiple auxiliary storage devices such as DASD 170. As shown in FIG. 1, DASD 170 may be a floppy disk drive which is capable of reading and writing programs or data on disk 180. DASD 170 may also be any other type of DASD known to those skilled in the art. This would include floppy disk drives, CD-ROM drives, hard disk drives, optical drives, etc. Disk 180 represents the corresponding storage medium used with DASD 170. As such, disk 180 can comprise a typical 3.5 inch magnetic media disk, an optical disk, a magnetic tape or any other type of storage medium.

It is important to note that while the present invention has been (and will continue to be) described in the context of a fully functional computer system, those skilled in the art will appreciate that the mechanisms of the present invention are capable being distributed as a program product in a variety of forms, and that the present invention applies equally regardless of the particular type of signal bearing media used to actually carry out the distribution. Examples of signal bearing media include: (a) recordable type computer readable media such as floppy disks (e.g., disk 180), hard disks and optical disks (e.g., compact disks), and (b) transmission type media such as digital and analog communication links, including wireless communication links.

Browser 124 displays images and text. An image is currently being displayed as image 127. Images are displayed with the help of graphics viewer 125 and image interpreter 126. Graphics viewer 125 displays images within browser 124, and image interpreter 126 takes received information from browser 124 or graphics viewer 125 and turns the information, which is basically a number of ones and zeros, into an image. In this depiction, graphics viewer 125 is a "plug-in" or "helper" that browser 124 uses to display images. For each type of image (e.g., Global Interchange Format (GIF), Joint Photographic Experts Group (JPEG), or bitmap), there will generally be one image interpreter 126. There can be more than one image interpreter 126 for each graphics viewer 125, or there could be one image interpreter 126 for each graphics viewer 125. The functionality of both graphics viewer 125 and image interpreter 126 can both be placed into graphics viewer 125. In addition, the functionality of graphics viewer 125 can be included in browser 124, and browser 124 may also be included in operating system 122. Furthermore, graphics viewer 125 could be used solely to view images. In this case, web browser 124 would then not be needed. These devices are split here to aid in understanding the invention.

Image interpreter 126 translates received data into image data. This image data can then be displayed by image interpreter 126, graphics viewer 125, or web browser 124, depending on the configuration of system 100. Generally, image interpreter 126 will translate received data into image data and then "hand" this image data to graphics viewer 125, which then displays this information on browser 124. Image interpreter 126 will usually be receiving the highest priority portions of a file first; as such, image interpreter 126 will inform graphics viewer 125 and/or browser 124 of where to place the current portion of image data. As stated previously, graphics viewer 125 and browser 124 can be combined into one browser or image viewer. This is a helpful interpretation at times because a receiving system using this configuration would use interpreter 126 to translate received data into image data that is displayed by an image viewer.

Turning now to server 190, server 190 is another computer system similar or exactly equivalent to system 100. Server 190 serves two general purposes: it transmits data (including image files) and it contains programs that allow an image designer to select portions of an image file, prioritize those portions, and save the prioritized image file in a graphics file format that supports prioritization. Server 190 contains an operating system 194 that may be different from or the same as operating system 122. Server 190 also has a server program 196. Server program 196 allows access by other users to files on server 190. Typically, these files will be of the type generally used in association with web browser 124 (e.g., sound, graphics, video, Hypertext Markup Language (HTML), text, etc.). The functionality of server program 196 may be placed into operating system 194. Server program 196 is generally not necessary for the proper operation of embodiments of the current invention. The embodiments of the current invention will operate with any method that allows an image to be transmitted and received in accordance with embodiments of the current invention.

Figure 2:
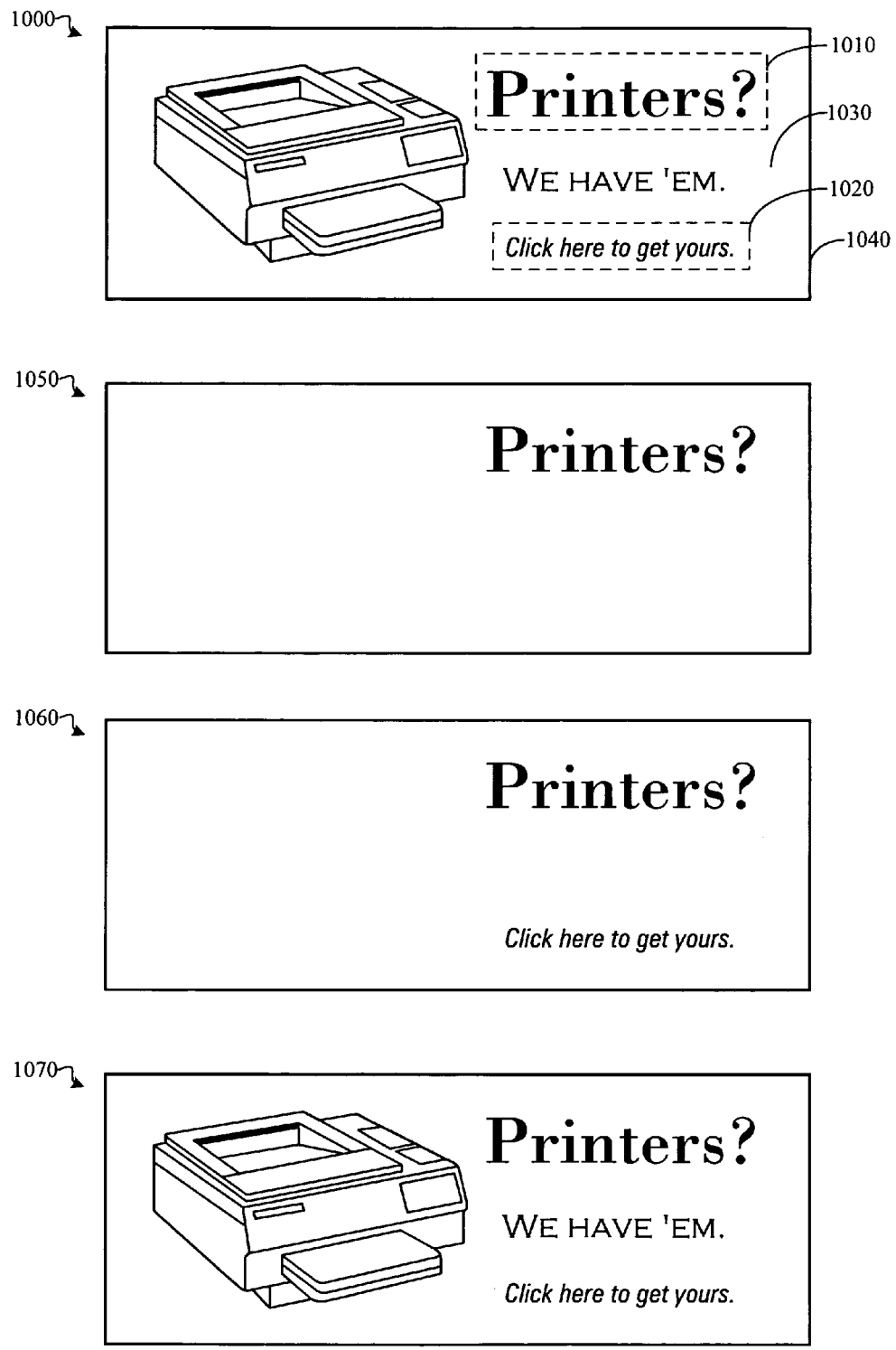
FIG. 2 is a series of four views of one graphic that has been marked, transmitted, and received in accordance with a preferred embodiment of the present invention.

Image prioritization editor 198 allows an image designer to select portions of image 197. An example of the selection of different areas of an image is shown in FIG. 2 below. The image designer can then assign priorities to each selected portion. Generally, there will be several different priorities. Image prioritization editor 198 also allows a prioritized image file (an image file where portions have been selected and assigned priorities) in a variety of image file formats. To save an image file as a prioritized image file, image prioritization editor 198 generally uses a separate "plug in" or program that supports one or more file formats, such as image interpreter 184. When server program 196 sends the image to system 100, those portions of the image assigned the highest priority will be sent first. This allows the graphical image 127 that is loading in web browser 124 on system 100 to display the most important information of the graphic first. Generally, server program 196 will not specifically target portions of the file containing the prioritized images to try and send these targeted portions first. Instead, in the preferred embodiment, the image itself, in whatever file format it is in, will be stored as it will be sent. Thus, server program 196 will generally be oblivious to the change in the file format, and server program 196 merely sends the file as it would send any other file.

Image interpreter 184 translates the prioritized sections of image 197 into the file format (or file data) that the image designer has selected. The file format is generally selected by using menus associated with image prioritization editor 198. The file format, when sent to the user who is accessing the file, will then become the received data received by system 100, translated by image interpreter 126 back into data, and displayed on web browser 124. The functionality of image interpreter 184 may be incorporated into image prioritization editor 198. The various file formats (bitmap, GIF, JPEG, etc.) will preferably be modified or extended to include reordering of image information so that prioritization of portions of the image can occur. Generally, other than the new prioritization scheme, the file formats and the image designer's viewing of these formats will remain the same. For instance, if an interlaced GIF is being loaded on web browser 124, the highest priority portion of image 127 will be shown in interlaced format until it loads completely. Then the next highest priority portion will begin loading in its interlaced format. This will continue until all portions of the image have been loaded. In a preferred embodiment, this will cause the portion of the image with the highest priority to completely load before any other portion of the image. As another example, for images in the JPEG format, the blocks of data that will make up the portion of the image having the highest priority should sent, received, and loaded first.

When an image designer is using server 190 to design a prioritized image, some testing of the prioritization will usually be performed. Selecting and assigning priorities to portions of an image will usually be an iterative process: the image designer selects one or portions of an image, assigns these portions a priority, saves the image in a prioritized image file, and then simulates receiving the image to ensure that the prioritization is as the image designer imagined and wants it to be. In this regard, simulation browser 186, shown in the example of FIG. 1 as displaying an image 187, is used to test the prioritization scheme performed on image 197. A general-purpose browser could also perform this function; however, because the image will load so quickly if the image is on the server, a time delay is usually required to simulate reception of a prioritized image. Simulation browser 186 can add a time delay between prioritized portions of an image to more adequately indicate how the prioritized file will really be seen by a user.

Thus, image 187 will generally show the progression of portions of images that make up image 197. The portions of image 187 will be shown in the order chosen by the image designer in image prioritization editor 198. There will be a delay between portions of image 197 being displayed as image 187 so that the image designer can see the various portions as they load. If necessary, simulation browser 186 could have all functionality of web browser 124, or it could be solely an image viewer. In this example, image interpreter 184 works with both image prioritization editor 198 and simulation browser 186, but both could have independent image interpreters or simulation browser 186, image interpreter 184, and image prioritization editor 198 could be encompassed in one image prioritization editor 198.

Image interpreters 126 and 184 will usually perform different functions. Image interpreter 126 is used to receive files (and thus should not need compression capabilities, for instance), while image interpreter 184 is used to compress, decompress, and store prioritized images. The general steps incurred in saving and subsequently receiving a file will be that image interpreter 184 translated an image and stored the image in a file (in a particular file format wherein the data may be compressed or interlaced). Server program 196 transmits the file and system 100 receives portions of the file as they arrive. As the portions arrive as received data, image interpreter translates the received data back into image data. This translation could include decompression. The translation will generally include determining where the image data is to be placed. Then image interpreter will give the image portion and location to the program that displays the image portion. Even though the functionality of image interpreter 126 and 184 may be different, they may also perform the exact same functions if this is desired.

The invention is most easily understood with reference to an example depicting the selection and prioritization of areas of an image and the subsequent reception of the image by a user. FIG. 2 shows four images of an imaginary advertisement. Advertisement 1000 depicts a prioritized image, while advertisements 1050, 1060, and 1070 depict the progression of the image on a user's computer. Advertisement 1000 has been marked with several areas of higher priority in this example. Advertisement 1000 has been marked with highest priority area 1010 and medium priority area 1020. In this example, low priority area 1020 is given the lowest priority automatically, even though the person marking the image (called the image designer) has not marked this section with a priority. Because the image has been prioritized, the highest priority parts of the image will be sent to a user first, anytime there is an access by the user of this advertisement. Such an access could be made when the user directs a browser to a particular World Wide Web (WWW) address that contains this advertisement. Border 1040 is placed around the advertisements in FIG. 2 solely to demarcate the advertisements' boundaries.

Advertisements 1050, 1060, and 1070 depict the progression of the display of the image on the user's browser. Because high priority area 1010 is sent by the sending computer first, the receiving computer (the user's computer) will display this section of the image first. This is shown in advertisement 1050, where highest priority area 1010 is displayed in its proper location. Similarly, the next highest priority area is sent by the sending computer and received by the user's computer. This is depicted in advertisement 1060. Finally, the entire image is displayed on the user's computer in advertisement 1070. If the user is connected to the sending computer through a very fast connection, the progression from advertisement 1050 to advertisement 1070 will occur very rapidly. Under normal modem connections, this progression will be very discernable. Thus, the present invention allows image designers to determine which parts of their image gets shown to a user first.

Figure 3:
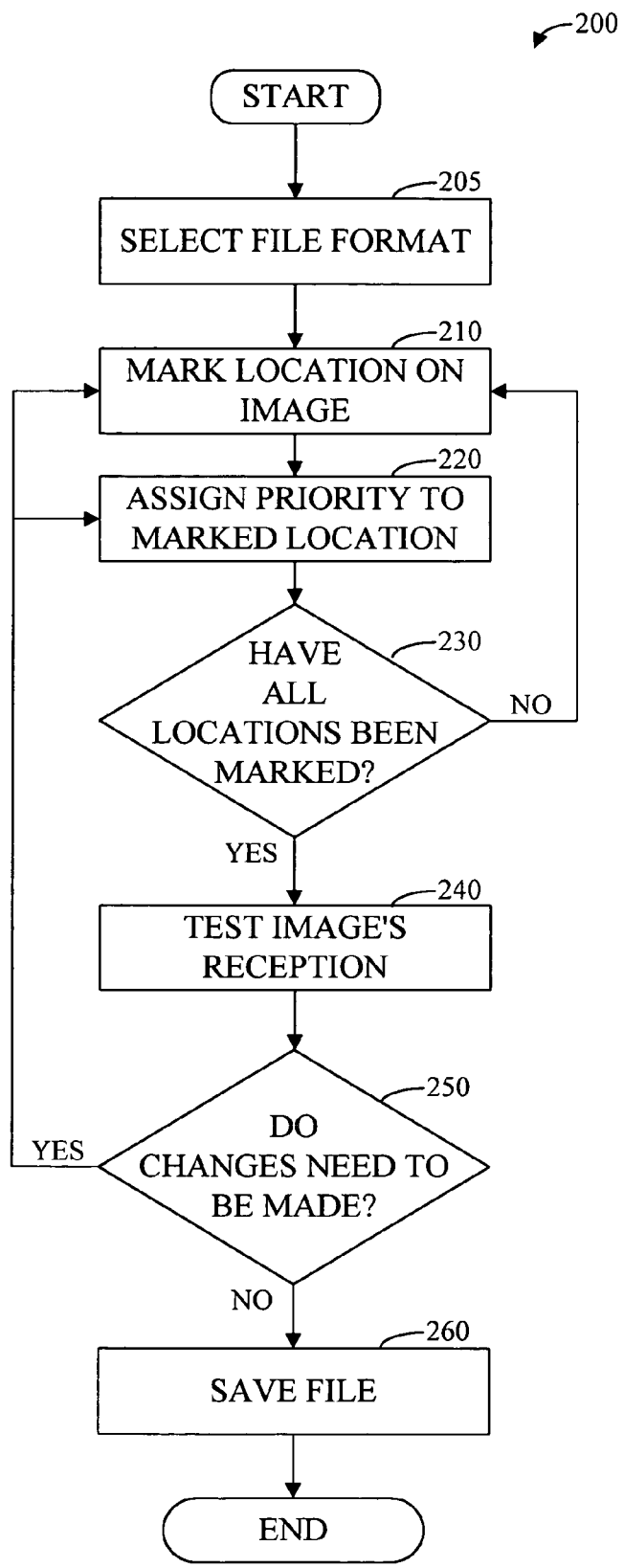
FIG. 3 is a diagram of a method used to mark portions of an image and to assign priorities to these marked portions in accordance with a preferred embodiment of the present invention.

Referring now to FIG. 3, a method 200 for prioritizing and saving a file is shown. This method is used by a designer to select portions of an image file, assign selected portions priorities, save the image file as a prioritized image file (in some image file format such as bitmap), test the reception of the prioritized file, and make changes if needed. Method 200 begins when a image designer selects a file format. This occurs in step 205. Although step 205 could be moved to another location in method 200 (for instance, step 205 could be moved until after step 250 but before step 260), the file format in which an image is saved may cause slight changes in the actual stored and received image. Because of this, it is preferred that the file format be selected first. Note that this file format may be different than the file format in which the file was originally stored. For instance, an image designer may choose to store a file in bitmap format without compression and then mark and modify this file. The marked and modified file could then be stored in a different format with a different name. This allows the designer to retain an unchanged, uncompressed version of the file while still marking, compressing, and saving a different version. This is especially helpful because compression can at times have deleterious effects on certain images.

The image designer next marks or selects a location on an image. Generally, this would be done when the image designer is running image prioritization editor 198 and the image designer selects portions of image 197. Once a portion of image 197 has been selected, the designer assigns priorities to each selected portion. This occurs in step 220. If all locations have not been selected (step 230=NO), the designer will continue to mark another portion (step 210) and assign the marked portion a priority (step 220). If desired, the image designer could mark all portions first then assign each portion a priority. In addition, there could be a default priority given to all portions of the image, such that any portions not given a priority will be automatically assigned a priority.

Once all marked portions have been assigned priorities (step 230=YES), the designer will generally test the image by receiving the image in the way the image would actually be received (step 240). This will generally entail using image prioritization editor 198 to send the image to simulation browser 187, preferably using a delay to simulate actual reception through a network. Then, the designer may make changes, if desired, in step 250 (step 250=YES). New or different portions may need to be marked (step 210) or the same portions may need to be reassigned priorities (step 220).

Once there are no longer any changes (step 250=NO), the image designer will generally save the file. The file is saved (step 260) in the file format selected by the image designer in step 205. A method for saving the file in the particular format chosen will be described in reference to FIG. 5.

Figure 4:
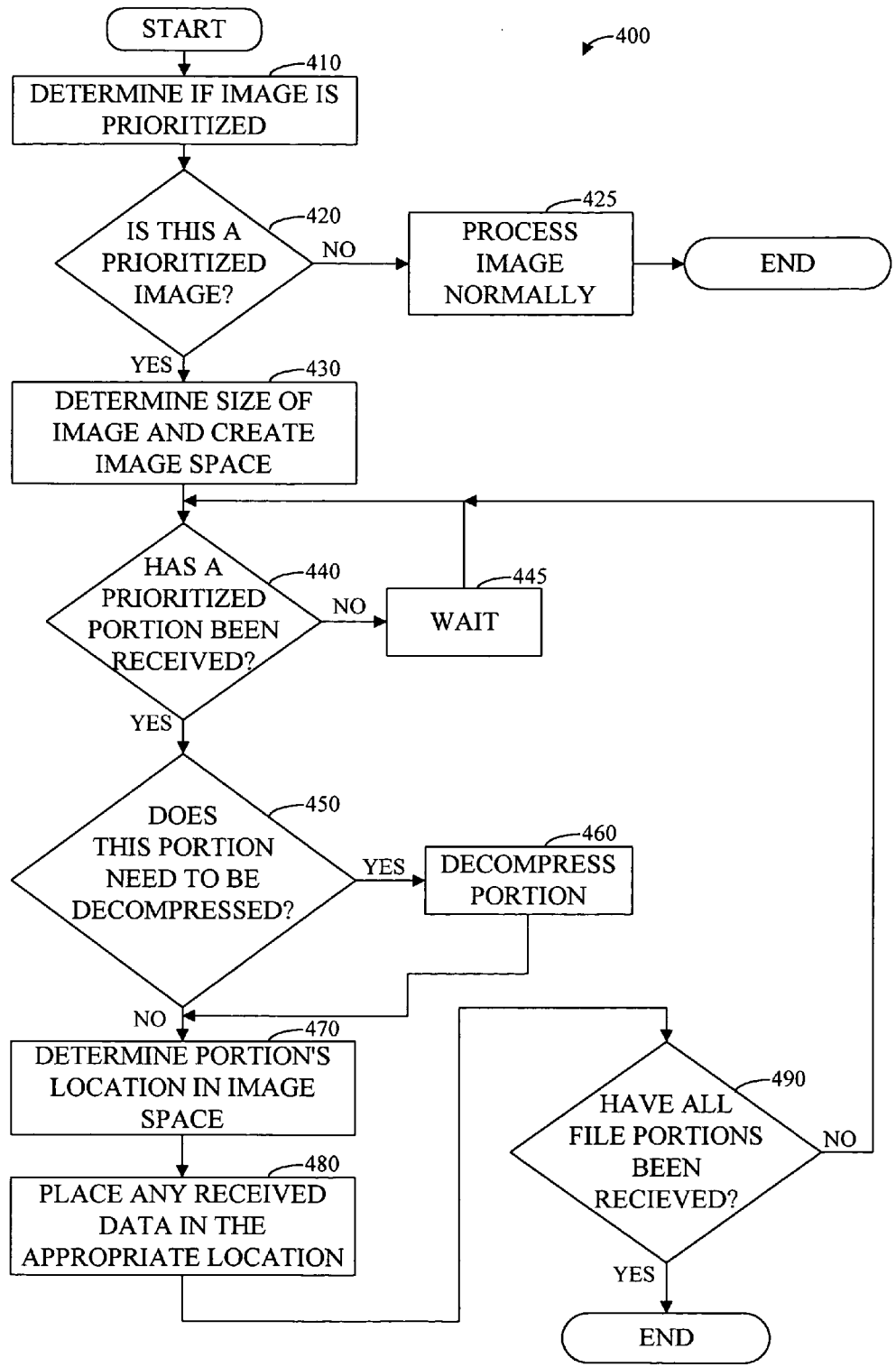
FIG. 4 is a method used when receiving images in accordance with a preferred embodiment of the present invention.

Referring now to FIG. 4, a method 400 for receiving an image in accordance with a preferred embodiment of the present invention is shown. Method 400 determines if a received image file (or a portion of an image file) is prioritized and, if the file is prioritized, displays the prioritized portions of the image. After an image has been prioritized and the prioritized image has been saved in a prioritized format, server 190 will transmit the file when a user requests the file. Generally, the user will be using computer system 100 and be accessing server 190 through network interface 165. Method 400 would be performed on the user's computer as web browser 124 begins receiving an image file. Method 400, thus, begins when an image starts to be received and a determination is made concerning the image's prioritization (step 410). If the image has not been prioritized (step 420=NO), the image is processed normally (step 425). If, however, the image is prioritized (step 420=YES), the image starts to be processed as a prioritized image.

First, the size of the image is determined and an image space is created (step 430). Generally a web browser or graphics viewer will clear a space on its presentation space for the image. Note that step 430 could just as easily be the first step in the process because all images will need to be displayed at some time. Once a space is cleared, image interpreter 126 will see if a prioritized portion (or part of a prioritized portion) has been received (step 440). Image interpreter 126 works with graphics viewer 125 and/or web browser 124 to show images on graphics viewer 125 and/or web browser 124. If not enough of a prioritized portion has been received (step 440=NO) to create some amount of the portion of the image, image interpreter 126 will wait. This occurs in step 445.

It is important to note that the type of file format being received will affect the steps in method 400. For instance, for Joint Photographic Experts Group (JPEG) files, a certain number of blocks of data must be received before a portion of the image file can be decompressed. For interlaced GIF files, a line of interlacing is generally received before being placed onto web browser's or picture viewer's presentation space (and, thus, being visible to a user).

On the other hand, if enough information has been received that image interpreter 126 can show the snippet or all of the portion being received (step 440=YES), then image interpreter 126 will show this snippet or all of the portion that has been received. If the portion or snippet of the portion of the image needs to be decompressed (step 450=YES), the portion or snippet of the image is decompressed. This decompression occurs in step 460. If decompression is not needed or if decompression is complete, image interpreter 126 will then determine the portion's or the part of the portion's location in the image space (step 470). Image interpreter 126 will place this data in the appropriate two- or three-dimensional location (step 480). Image interpreter 126 will then check to see if all portions have been received. If all portions of the image have not been received (step 490=NO), then image interpreter 126 will begin to gather more image portions in steps 440 and 445. If all portions of the image have been received (step 490=YES), then image interpreter 126 will end until called again.

As previously stated, image interpreter 126 can be a "helper" application, which is called by a web browser or image viewer to display a particular type of image file. Image interpreter 126 could also be made to display a multitude of different file formats or the functionality of image interpreter 126 could be added directly into a web browser or image viewer. Generally, image interpreter 126 will be a helper that will "hand" image portions to the web browser or image viewer such that the web browser or image viewer will know where to put the image portions. Image interpreter 126 will usually contain any necessary algorithms and methods that are needed for decoding compression routines. For instance, the Lempel-Ziv-Welch (LZW) compression and decompression algorithm could be used in GIF files. All needed routines and software necessary to support the compression and/or decompression of LZW data should be placed in image interpreter 126 so that image interpreter 126 can compress/decompress GIF files that use the LZW compression. Similarly, any other compression/decompression scheme (e.g., JPEG, Run-Length Encoding, Huffman encoding, etc.) that is necessary for viewing or saving files in any other image format could be built into image interpreter 126.

Marking, sending, and receiving prioritized images have been described. Saving the file in a particular image format will now be described. The simplest method for saving a file in a particular file format (e.g., JPEG, GIF) is to break the prioritized image into the smaller, prioritized portions and then apply the image format (complete with compression, if desired) to those portions. Each portion could be placed into the file with header information that describes where the prioritized portion is to be placed. If necessary, additional information describing the size of the portion may also be placed in the file. Finally, any information necessary for the particular file format may be placed in headers, footers, or around prioritized portions.

As an example, referring back to FIG. 2, highest priority area 1010 is a portion of advertising image 1000. This portion starts at a particular location, which, for this example, is the upper right corner of highest priority area 1010. This location, relative to the upper right corner of advertising image 1000, could be placed before highest priority image 1010 in the file. Then the compression (e.g., LZW compression) or viewing scheme (e.g., interlaced GIF) can be applied to highest priority area 1010 and the resulting information can be stored in the file. Similarly, the next-highest priority area (medium priority area 1020) can be placed into the file by storing its location and then its image data, after compression or interlacing if needed. This process could continue until all prioritized portions of image 1000 have been placed into a graphics file.

Figure 5:
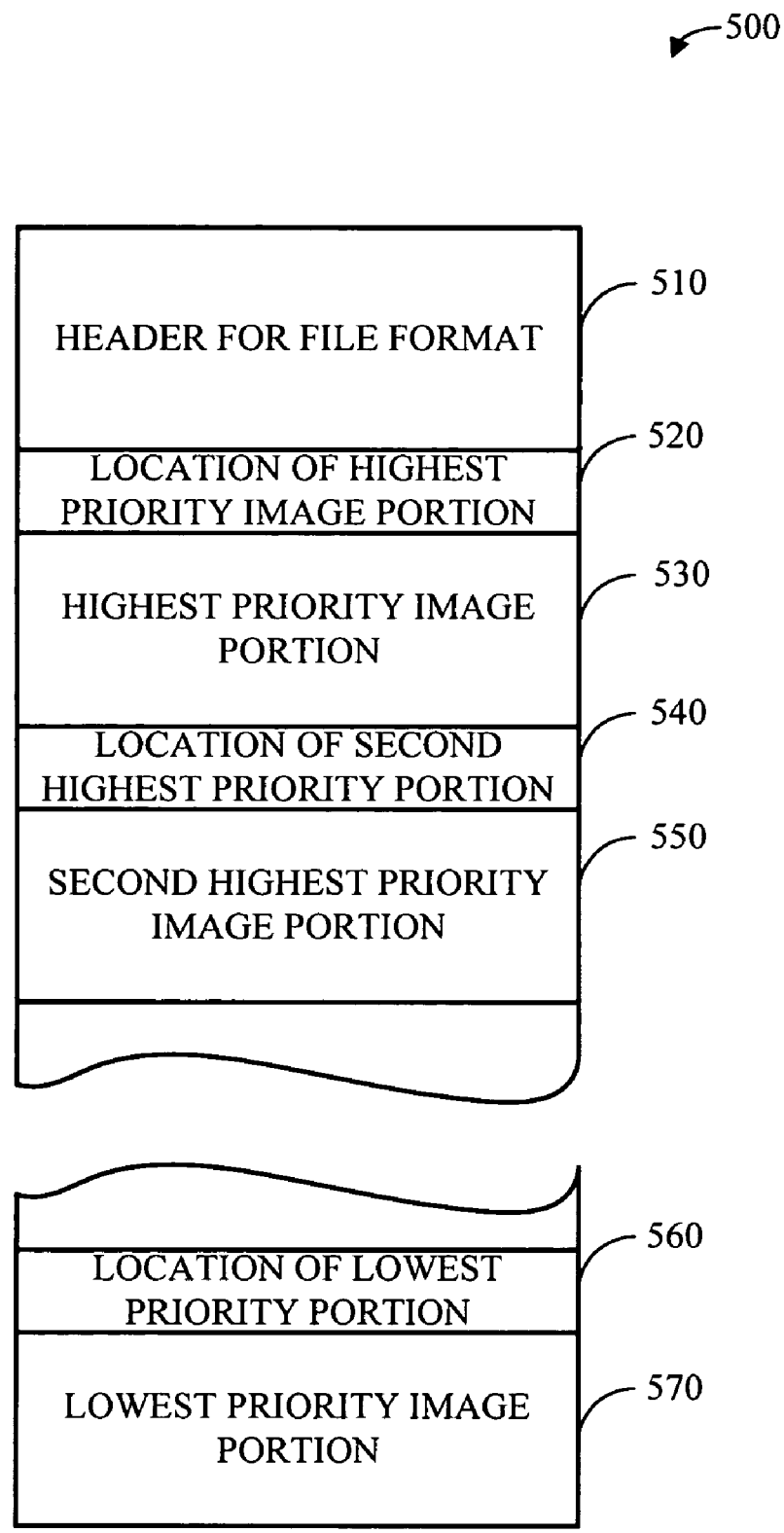
FIG. 5 is a diagram of a prioritized graphics file stored in a file format in accordance with a preferred embodiment of the present invention.

An example graphics file, which contains a prioritized image, is shown in FIG. 5. Prioritized file 500 begins with a header 510. Header 510 contains data used to indicate the type of file format, compression being used, size of file, etc. Each file format will generally require a different header 510. After header 510 is the location 520 of the highest priority image. As explained above in reference to FIG. 2, this location will usually be a relative location from a particular starting point in a graphics file. However, it could be any other location able to place the image portion on a screen. Next, the highest prioritized image portion, after compression or interlacing, is placed in location 530. The second-highest priority image portion is then placed in locations 540 and 550 by placing the location 540 and data 550 into the file. This continues until the lowest priority portion of the image is placed into the file in locations 560 and 570.

This example graphics file can be modified as necessary to include other data or information. This information could be interspersed between locations in FIG. 5, or it could be added to the locations described in FIG. 5. Different file formats will require different headers, footers, data locations, etc., and the file format shown in prioritized file 500 can be modified as necessary to support and store an image that has been partitioned into prioritized portions.

Figure 6:
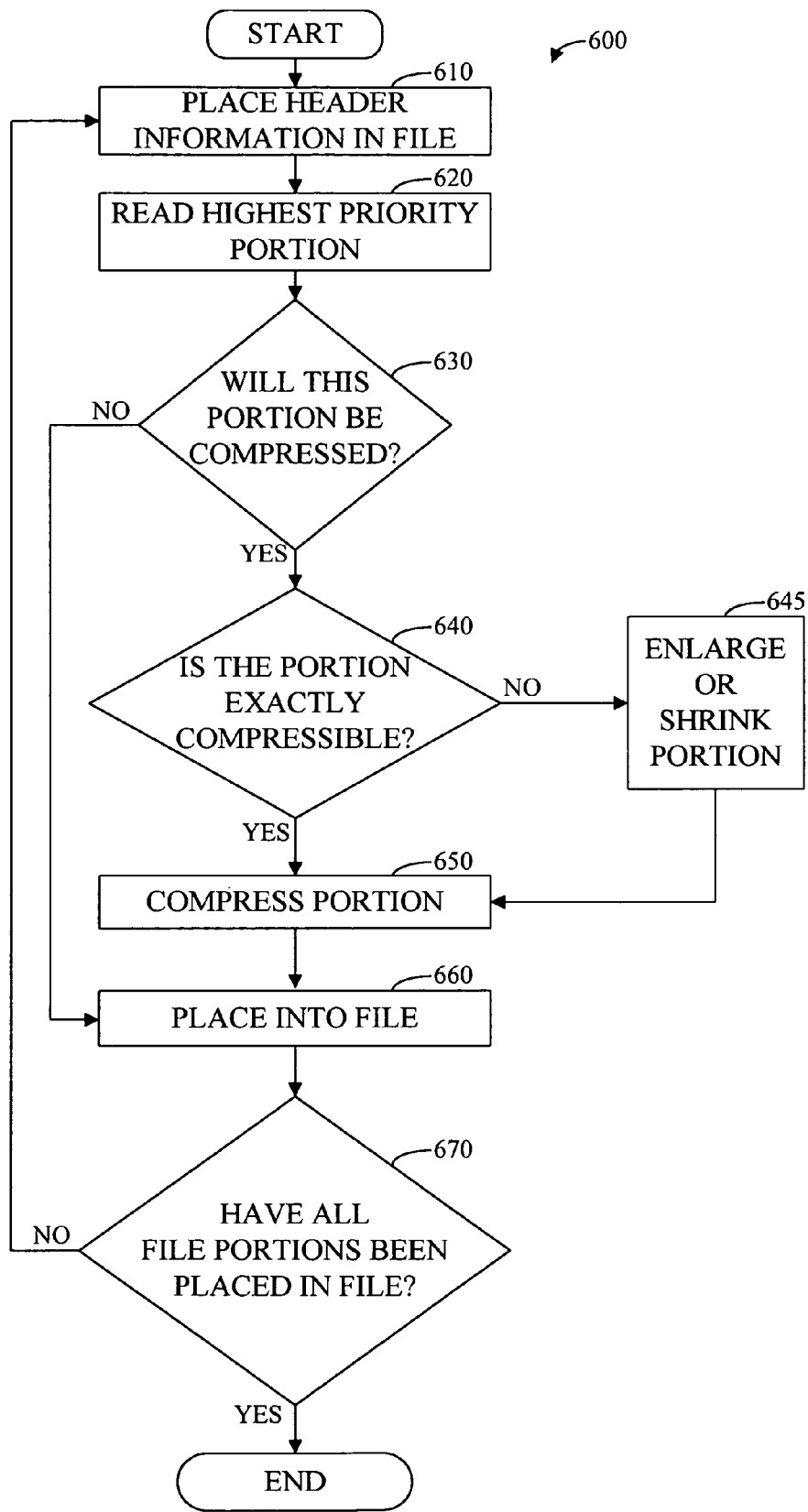
FIG. 6 is a method for storing a prioritized graphics file in accordance with a preferred embodiment of the present invention.

Referring now to FIG. 6, a method 600 is shown for converting a marked, prioritized file into a graphics file format. When a file is saved in a particular file format, exemplary method 600 may be used to store the file in a prioritized manner similar to that shown in FIG. 5. Essentially, method 600 can occur as step 260 of method 200, but method 600 may be used any time a prioritized image file would be saved. Method 600 starts in step 610 when header information is placed into the file. This step will generally be performed because most file formats require some type of header. This step can also include placing location information (such as location information 510) or other needed information about the portion into the file. Next, the highest priority portion of the image is read in step 620. This could occur by reading the image from disk or memory. If this portion will be compressed (step 630=YES), then image interpreter 126 (or image interpreter 184) will determine if the image portion is exactly compressible in the image format chosen. Some image formats, in particular JPEG, only can compress certain sizes or blocks of image data. If the image size is not exactly compressible (step 640=NO), then the prioritized portion is slightly enlarged or shrunk so that it is exactly compressible. For instance, if JPEG compression is being used and JPEG requires 10 by 10 blocks, but the image designer has marked a 10 by 8 block, then this block will be increased to 10 by 10.

Once the portion has been enlarged or shrunk, or if it was exactly compressible (step 640=YES), then the portion is compressed in step 650. This compressed portion is placed into the file in step 660. Step 660 may also be reached if the image portion will not be compressed (step 630=NO). Next, image interpreter 126 or 184 checks to see if all file portions have been placed into the file (step 670). If all file portions have not been placed into the file (step 670=NO), then header information for the next highest priority portion of the image is placed into the file. If all information is placed into the file (step 670=YES), then the image interpreter quits.

Method 600 can be adapted to support a wide variety of graphics file formats. In particular, method 600 can be adapted to support interlacing or interleaving. To support interlacing, a step can be added between steps 620 and 630 to test if interlacing is required. If interlacing is not required, then steps 630, 640, etc. could continue normally. If interlacing is required, another step between steps 620 and 630 could interlace the image portion. The compression steps would then compress the interlaced drawing. Each line would be compressed in this manner, and all compressed lines, in order of interlacing, could be placed into the graphics file. In this manner, each higher priority of the image will be located closer to the beginning of the file, and each portion of the image will be interlaced and compressed. When such an image file is received, it is important that the browser or image viewer not write over the portions of the image already received.

The preferred embodiments of the present invention allow an image designer to select portions of an image and to prioritize these portions. The image can then be saved as a prioritized image file, which generally entails placing higher priority portions toward the beginning of the file. These image files can be stored in any number of graphics file formats. When a user on another computer accesses the image files, the image files will be transmitted, received, and displayed by the user's computer in order of prioritization. This allows higher-speed access to the important part of graphics files.

While the invention has been particularly shown and described with reference to preferred exemplary embodiments thereof, it will be understood by those skilled in the art that various changes in form and details may be made therein without departing from the scope of the invention. For instance, bitmap, GIF and JPEG have been used as examples of popular file formats for which the embodiments of the present invention are particularly applicable. However, the embodiments of the current invention are applicable to any file format in which files may be transmitted and received over any network architecture. In addition, although the selected locations (which then become prioritized portions) have been shown as rectangles, these locations can be made in any shape known to those skilled in the art (i.e., they could be round, triangular, octagonal, etc.).

The invention claimed is:

1. A method for transmitting a graphics file from a transmitting computer and receiving the graphics file on a receiving computer, the method comprising the steps of:
 a) performing the following steps on the transmitting computer:
  i) selecting at least one image transmission portion of the graphics file;
  ii) assigning a priority to the selected at least one image transmission portion to create a prioritized graphics file; and
  iii) transmitting the prioritized graphics file across a network such that higher priority image transmission portions are transmitted before lower priority image transmission portions;
 b) performing the following steps on the receiving computer:
  i) receiving a first image transmission portion of the prioritized graphics file;
  ii) translating the first image transmission portion into image data;
  iii) determining the location of the first image transmission portion; and
  iv) transferring the image data and the location to an image viewer such that the image viewer can display the first image transmission portion at the location,
 wherein the step of transmitting the prioritized graphics file across a network such that higher priority image transmission portions are transmitted before lower priority image transmission portions further comprises the following steps:
  A) simulating transmission and reception of the first image transmission portion of the prioritized graphics file;
  B) translating the first image transmission portion into image data;
  C) determining the location of the first image transmission portion;
  D) transferring the image data and the location to an image viewer such that the image viewer can display the first image transmission portion at the location;
  E) waiting a delay; and
  F) repeating steps A through E in each additional iteration of one or more additional iterations of steps A through E, such that the first image portion is stepped to the next image portion of the prioritized graphics file in the first additional iteration and the next image portion of the prioritized graphics file is sequentially stepped in each subsequent additional iteration, until the entire prioritized graphics file has been transmitted and received.

2. The method of claim 1 wherein the step of translating the image transmission portion of the prioritized graphics file into image data further comprises the step of decompressing the image transmission portion of the prioritized graphics file.

3. The method of claim 1 further comprising the following step that is performed on the transmitting computer:
 iv) saving the prioritized graphics file in a prioritized graphics file format.

4. The method of claim 3 wherein the prioritized graphics file format comprises joint picture experts group format, graphics interchange format, or bitmap format.

* * * * *